United States Patent [19]

Ogawa

[11] Patent Number: 5,088,002
[45] Date of Patent: Feb. 11, 1992

[54] CERAMIC ELECTRONIC COMPONENT AND METHOD OF FABRICATING THE SAME

[75] Inventor: Toshio Ogawa, Nagaokakyo, Japan

[73] Assignee: Murata Mfg. Co., Ltd., Japan

[21] Appl. No.: 675,148

[22] Filed: Mar. 26, 1991

[30] Foreign Application Priority Data

Mar. 26, 1990 [JP] Japan .............................. 2-77199

[51] Int. Cl.$^5$ .................... H01G 4/10; H01G 7/00; H01L 27/02
[52] U.S. Cl. .................... 361/321; 29/25.42; 357/51
[58] Field of Search ........................ 361/311–313, 361/320, 321; 29/25.42; 357/51

[56] References Cited

U.S. PATENT DOCUMENTS 3,721,870  3/1973  Eage ........................ 29/25.42
4,241,378  12/1980  Aorrian ..................... 29/25.42 X Primary Examiner—Donald Griffin
Attorney, Agent, or Firm—Ostrolenk, Faber, Gerb & Soffen

[57] ABSTRACT

A ceramic electronic component having a structure in which thin film electrodes made of a Ni-Al system alloy or a Ni-Cr-Al system alloy are formed so as to make contact with a functional ceramic thin film.

9 Claims, 3 Drawing Sheets

CERAMIC ELECTRONIC COMPONENT AND METHOD OF FABRICATING THE SAME

BACKGROUND OF THE INVENTION

1. Field of the Invention

The present invention relates generally to a ceramic electronic component in which electrodes are formed so as to make contact with a functional ceramic thin film and a method of fabricating the same, and more particularly, to a ceramic electronic component in which electrodes contacting a ceramic thin film are improved and a method of fabricating the same.

2. Description of the Prior Art

In fabricating an electronic component having a functional ceramic thin film which is crystalline, attempts have been made in recent years to form a functional ceramic thin film in a deposited state on a substrate so as to simplify the structure of the component. Thus, when the ceramic thin film which is crystalline is formed in a film deposited state, a substrate on which the thin film is formed must be heated in a predetermined atmosphere of film formation.

On the other hand, in taking out its function, for example, electrical properties from the functional ceramic thin film, electrodes must be formed in such a manner as to make contact with the ceramic thin film. Consequently, it is necessary that thin film electrodes are formed on a substrate and then, a functional ceramic thin film which is crystalline is formed in a film deposited state on the thin film electrodes. In such a case, while the functional ceramic thin film is being formed, the thin film electrodes themselves formed beneath the ceramic thin film are also exposed to high temperature. Accordingly, as an electrode material used for this type of application, one superior in stability at high temperature is required.

Furthermore, a functional ceramic thin film having a thickness of several μm may react with thin film electrodes having a thickness of submicrons while the ceramic thin film is being formed, to degrade the functionality of the ceramic thin film. Consequently, it is also necessary to select an electrode material substantially low in reactivity with the ceramic thin film.

Additionally, when a functional ceramic thin film made of an oxide or a complex oxide material is formed, it is necessary to introduce an oxygen gas at the same time of film formation. Therefore, it is needed to use an electrode material not only superior in stability at high temperature and low in reactivity with the ceramic thin film but also superior in oxidation-resistance property at high temperature.

Since the above described electrode material is made to function as an electrode, it is naturally essential that its electrical conductivity is held good.

As electrode materials superior in oxidation-resistance property at high temperature, Pt, Au, Ta, Ti and the like have been conventionally used.

A PbTiO$_3$ film and a Pb(Zr, Ti)O$_3$ film containing reaction active Pb are formed, for example, by sputtering on each of electrodes made of Pt, Au, Ta and Ti which have been conventionally known as electrode materials superior in oxidation-resistance property at high temperature, to examine suitability of Pt, Au, Ta and Ti as the electrode materials. The results of the examination are shown in Table 1.

TABLE 1

| electrode material | oxidation resistance at high temperature | reactivity with ceramic thin film | other problems |
|---|---|---|---|
| Pt | very good | very low | high cost |
| Au | good | low | high cost |
| Ta | fit for use | high | — |
| Ti | good | high | — |

As obvious from Table 1, Pt and Au are superior in oxidation-resistance property at high temperature and low in reactivity with the ceramic thin film, while being very high in electrode cost.

Conversely, Ta and Ti are not too high in electrode cost, while being high in reactivity with the ceramic thin film and thus, cannot be used.

SUMMARY OF THE INVENTION

Accordingly, an object of the present invention is to provide a ceramic electronic component having a functional ceramic thin film and electrodes made of a material which is superior in oxidation-resistance property at high temperature, which is low in reactivity with the ceramic thin film and which is low in cost, and a method of fabricating the same.

The ceramic electronic component according to the present invention is characterized by comprising a ceramic thin film and thin film electrodes made of a Ni-Al system alloy or a Ni-Cr-Al system alloy which are formed so as to make contact with the ceramic thin film.

In the ceramic electronic component according to the present invention, it is for the following reasons that the thin film electrodes made of the Ni-Al system alloy or the Ni-Cr-Al system alloy are formed so as to make contact with the ceramic thin film. More specifically, the Ni-Al system alloy or the Ni-Cr-Al system alloy is superior in heat-resistance property as well as stability at high temperature. Moreover, it is also confirmed by the inventors of the present application that the Ni-Al system alloy or the Ni-Cr-Al system alloy is very low in reactivity with the ceramic thin film formed in a film deposited state in the oxidation atmosphere at high temperature so as to be crystalline.

Used as the Ni-Al system alloy in the present invention is, for example, one having composition containing 2.5 to 8% by weight of Al: the remainder being Ni and a trace element.

Used as the Ni-Cr-Al system alloy in the present invention is, for example, one having composition containing 8 to 25% by weight of Cr and 2.5 to 8% by weight of Al: the remainder being Ni and a trace element. The Ni-Cr-Al system alloy having such composition has been known as an alloy superior in heat-resistance property (U.S. Pat. No. 4,439,248).

In the present invention, the above described Ni-Al system alloy or Ni-Cr-Al system alloy is so arranged as to make contact with the ceramic thin film which is crystalline. Accordingly, even if electrodes formed of a Ni-Al system alloy thin film or a Ni-Cr-Al system alloy thin film are previously formed as an underlying layer of a ceramic thin film and then, the ceramic thin film is formed in a film deposited state so as to be crystalline, the thin film electrodes hardly react with the ceramic thin film. Further, the thin film electrodes themselves are stable at high temperature. Consequently, it is possible to obtain a ceramic electronic component having desired properties.

Furthermore, the Ni-Al system alloy or the Ni-Cr-Al system alloy is lower in cost than Pt or Au, thereby to make it possible to reduce the fabrication cost of the electronic component using the ceramic thin film which is crystalline.

As an electronic component so constructed that thin film electrodes make contact with a functional ceramic thin film as described above, a nonvolatile RAM (random access memory) comprising, for example, a ferroelectric capacitor can be listed. This nonvolatile RAM comprises a ferroelectric capacitor in which electrodes are formed on both major surfaces of a ferroelectric ceramic thin film so as to hold memory. If an electrode formed of the above described Ni-Al system alloy thin film or Ni-Cr-Al system alloy thin film is used as the electrodes of the ferroelectric capacitor, the present invention can be suitably utilized.

Therefore, if the present invention is applied to a nonvolatile RAM comprising a ferroelectric capacitor, a nonvolatile RAM having superior properties can be provided with good stability and at low cost.

The present invention provides a method of fabricating a ceramic electronic component comprising the steps of forming a Ni-Al system alloy thin film or a Ni-Cr-Al system alloy thin film on a substrate, heating the Ni-Al system alloy thin film or the Ni-Cr-Al system alloy thin film in the oxidation atmosphere, and forming a ceramic thin film on the Ni-Al system alloy thin film or the Ni-Cr-Al system alloy thin film after heating.

In the fabricating method according to the present invention, the Ni-Al system alloy thin film or the Ni-Cr-Al system alloy thin film is previously formed and then, the ceramic thin film is formed thereon, thereby to obtain the same effect as that achieved by the above described ceramic electronic component. Moreover, the Ni-Al system alloy thin film or the Ni-Cr-Al system alloy thin film is heated in the oxidation atmosphere prior to forming the ceramic thin film. Accordingly, an oxide film mainly composed of $Al_2O_3$ is formed on the surface of the Ni-Al system alloy thin film or the Ni-Cr-Al system alloy thin film. The oxide film mainly composed of $Al_2O_3$ prevents the reaction between the alloy thin film and the ceramic thin film. Furthermore, even if pin holes are formed in the ceramic thin film on the alloy thin film, electric conduction between the electrodes on and beneath the ceramic thin film with the pin hole can be effectively prevented due to the presence of the $Al_2O_3$ film as an electric insulation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of an embodiment of the present invention. The present embodiment is applied to a ferroelectric capacitor using a ferroelectric ceramic thin film. The ferroelectric capacitor is used in a nonvolatile RAM as described later.

Figure 1:
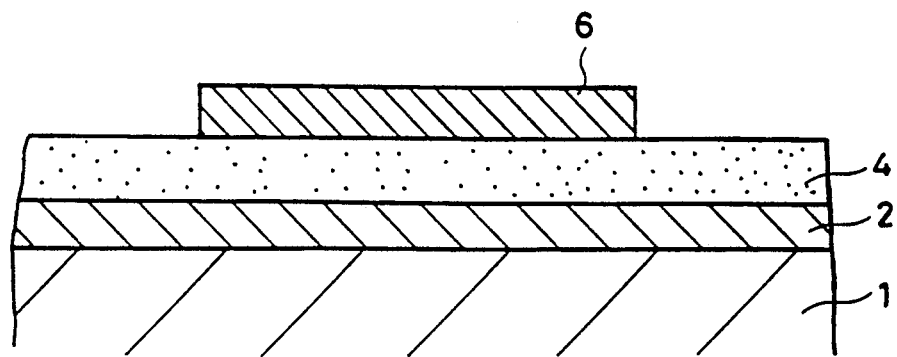
FIG. 1 is a cross sectional view showing main parts of a ceramic electronic component according to one embodiment of the present invention in an enlarged manner, which corresponds to a portion taken along a line I—I shown in FIG. 2.
Figure 2:
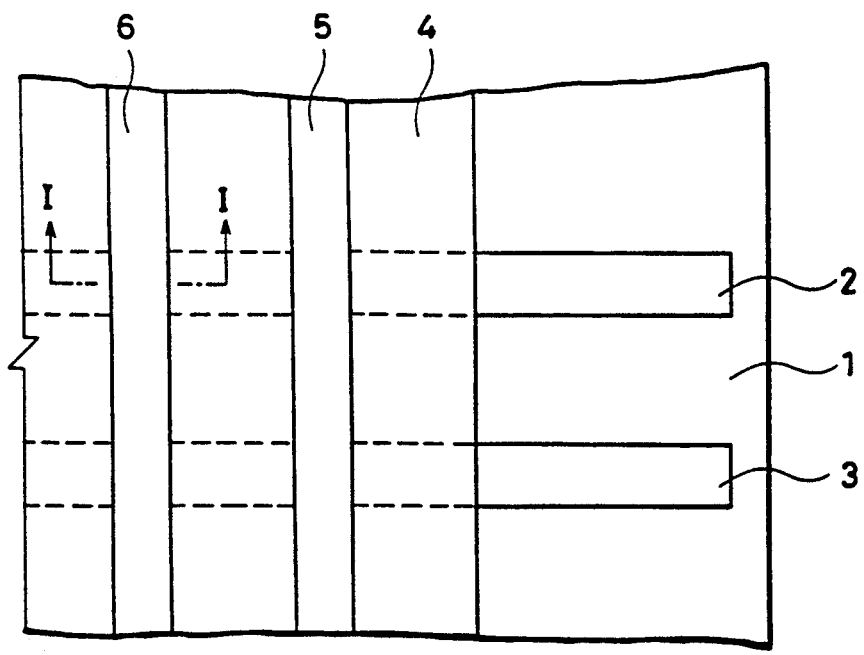
FIG. 2 is a partially cutaway plan view showing the main parts of the ceramic electronic component according to one embodiment of the present invention in an enlarged manner.

More specifically, as one embodiment of the present invention, a capacitor structure is formed in which thin film electrodes 2 and 3, a ferroelectric ceramic thin film 4 and electrodes 5 and 6 are laminated on a substrate 1, as shown in a cross sectional view of FIG. 1 and a partially cutaway plan view of FIG. 2. FIG. 1 is a cross sectional view showing a portion taken along a line I—I shown in FIG. 2 in an enlarged manner.

The foregoing will be explained concretely. First, a substrate made of a MgO single crystal of the crystal orientation [100] is prepared as a substrate 1. Then, a Ni-Al system alloy containing 91% by weight of Ni, 4.5% by weight of Al and 4.5% by weight of a trace element such as Fe and a Ni-Cr-Al system alloy containing 75% by weight of Ni, 16% by weight of Cr, 4.5% by weight of Al and 4.5% by weight of a trace element such as Fe are sputtered, with the MgO single crystal being covered with a metal mask under the following conditions, to form thin film electrodes 2 and 3 having a thickness of not more than 1 μm.

sputtering conditions
        substrate temperature Ts: 400° C.
        pressure of sputtering gas: $3.0 \times 10^{-3}$ Torr
        sputtering gas: Ar (100% by volume)
        RF power: 400 W/(around a target having a diameter of 4 in.)
    sputtering time: for several minutes Then, sputtering is made under the following conditions using $PbTiO_3$ ceramics as a target, to form a ferroelectric ceramic thin film 4 composed of $PbTiO_3$ having a thickness of 1 to 2 μm.

sputtering conditions
        substrate temperature Ts: 600° C.
        pressure of sputtering gas: $1.0 \times 10^{-2}$ Torr
        sputtering gas: $Ar/O_2 = 90/10\%$ by volume
        RF power: 200 W/(around a target having a diameter of 2 in.)
    sputtering time: for several hours Shortly before the second sputtering is started and until the substrate temperature Ts reaches 600° C., the conditions of the gas atmosphere are pressure = $1.0 \times 10^{-2}$ Torr and $Ar/O_2 = 90/10\%$ by volume, that is, the same conditions as those in the second sputtering.

In the above described manner, the thin film electrodes 2 and 3 and the ceramic thin film 4 are laminated on the substrate 1 and then, electrodes 5 and 6 are formed on the ceramic thin film 4 using the same material as that of the thin film electrodes 2 and 3 at room temperature.

The reactivity of the thin film electrodes 2 and 3 with the ceramic thin film 4, the ferroelectricity of the ceramic thin film 4 and the ratio of conduction due to a pin hole formed in the ceramic thin film 4 are examined. The ratio of conduction due to a pin hole is a value per an area one millimeter square of the overlapped region of the lower electrodes 2 and 3 and the upper electrodes 5 and 6. In addition, the ferroelectricity is confirmed by measuring the D-E hysteresis curve and the dielectric constant.

Figure 3:
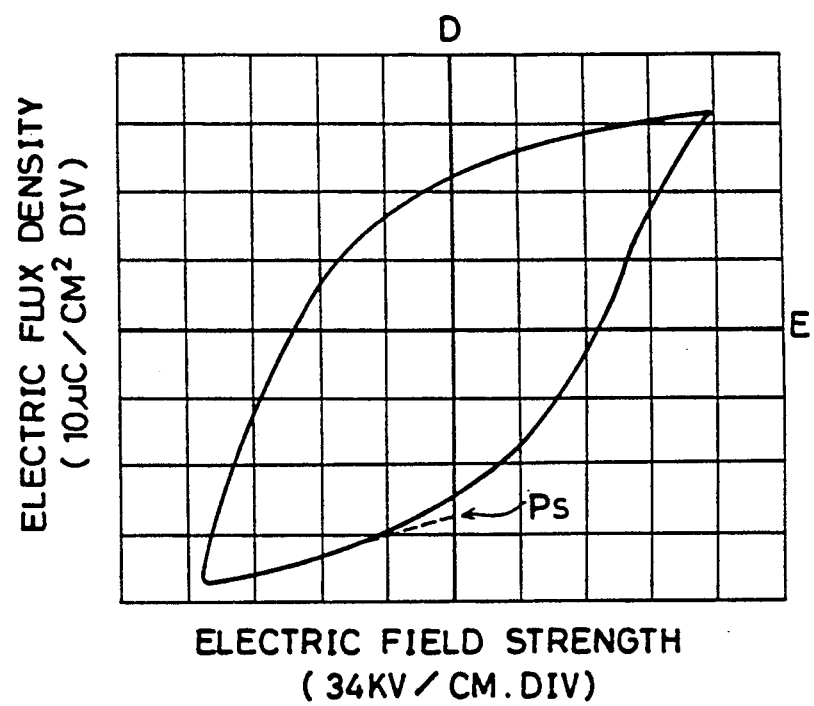
FIG. 3 is a diagram showing a D-E hysteresis curve.

The D-E hysteresis curve of a PbTiO$_3$ film with Ni-Cr-Al system alloy electrodes is shown in FIG. 3. FIG. 3 shows the characteristics in a case where a Ni-Cr-Al system alloy thin film electrode having a thickness of ~1 μm is used as upper and lower electrodes and a PbTiO$_3$ thin film having a thickness of 1.5 m is used as a ferroelectric ceramic thin film and the results of measurements made at a frequency of 60 Hz.

Additionally, as comparative examples, structures shown in FIGS. 1 and 2 are obtained in the same manner as the structures according to the present embodiment except that the thin film electrodes 2 and 3 are made of Pt, Au, Ta and Ti respectively which have been conventionally used as heat-resistive electrode materials. With respect to the comparative examples, the reactivity of the thin film electrodes 2 and 3 with the ceramic thin film 4, the ferroelectricity of the ceramic thin film 4 and the ratio of conduction due to a pin hole are examined. The results of the examination are shown in Table 2.

TABLE 2

| electrode material | reactivity with ceramic thin film | ferroelectricity | ratio of conduction due to pin hole |
|---|---|---|---|
| embodiment (Ni—Al) | no reaction | confirmed | 0/100 |
| embodiment (Ni—Al—Cr) | no reaction | confirmed | 0/100 |
| Pt | no reaction | confirmed | 30/100 |
| Au | slight reaction | confirmed | 50/100 |
| Ta | reaction | cannot be measured | — |
| Ti | reaction | cannot be measured | — |

As seen from a hysteresis curve shown in FIG. 3, it is understood that the value of a spontaneous polarization (Ps) is 28 μC/cm$^2$, which value is almost the same as that of ceramics. Also, the dielectric properties of the ferroelectric ceramic thin film are dielectric constant $\epsilon r = 350$ and tan $\delta = 0.04$.

As can be seen from Table 2, with the structures according to the present embodiment using the thin film electrodes made of the Ni-Al system ally and the Ni-Cr-Al system alloy as the same as with the thin film electrode of Pt, no reaction occurs between the ceramic thin film 4 and the electrodes 2 and 3, and the ferroelectricity of the ceramic thin film 4 is not degraded.

On the other hand, in the structures using the thin film electrodes made of Au, slight reaction occurs between the ceramic thin film 4 and the electrodes 2 and 3. Further, in the structures using the thin film electrodes made of Ta and Ti, reaction occurs between the ceramic thin film 4 and the electrodes 2 and 3, and the ferroelectricity of the ceramic thin film 4 cannot be measured.

Furthermore, with respect to the ratio of conduction due to a pin hole, it will be understood that the number of structures in which conduction through the ceramic thin film occurs is zero PC per 100 PCS structures according to the present embodiment, while the number of insulation-defective structures is respectively 30 PCS and 50 PCS per 100 PCS of structures using Pt and Au. Additionally, in the structures according to the present embodiment, voltage resistance is improved by 10 times or more that in the structures using Pt or Au. The reason for this is considered that with the electrodes made of Pt and Au, the ratio of conduction becomes higher with increase of the voltage when the pin hole or crack exists in the ceramic thin film so that voltage resistance becomes low.

The reason why there occurs no conduction through the ceramic thin film due to the pin hole and the like formed in the ceramic thin film 4 in the present embodiment is considered that an oxide film mainly composed of Al$_2$O$_3$ is formed on the surfaces of the thin film electrodes 2 and 3. More specifically, in the present embodiment, the thin film electrodes 2 and 3 formed by sputtering the Ni-Al system alloy or the Ni-Cr-Al system alloy are heated to a temperature of 600° C. in the oxidation atmosphere which contains 10% by volume of oxygen before the ceramic thin film 4 is formed. This heating in the oxidation atmosphere causes an oxide film mainly composed of Al$_2$O$_3$ to be formed on the surfaces of the thin film electrodes 2 and 3 as represented by a reference numeral 7 in FIG. 4.

Figure 4:
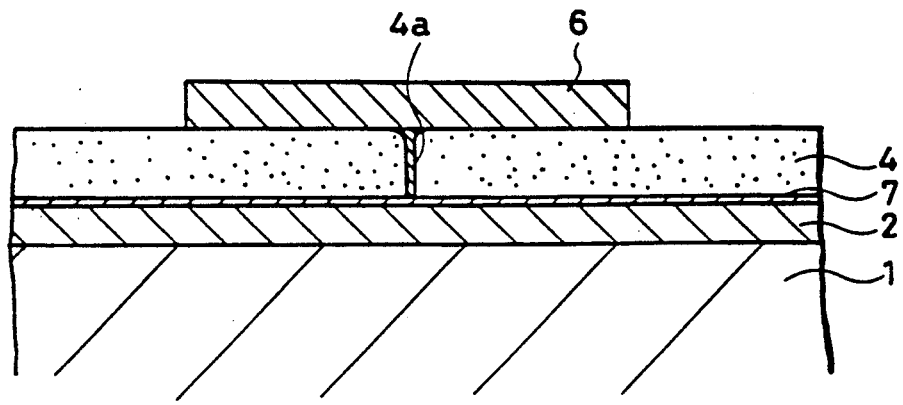
FIG. 4 is cross sectional view for explaining the function of an oxide film mainly composed of $Al_2O_3$ in a case where a pin hole is formed in a ceramic thin film.

Therefore, even if a pin hole 4a shown in FIG. 4 exists in the ceramic thin film 4 formed on the oxide film 7 of the electrode surface and an electrode material enters the pin hole 4a in a process of forming the upper electrode 6, conduction between the upper and lower electrodes 2 and 6 is reliably prevented because of the insulation properties of the oxide film 7. Thus, in the above described structures according to the embodiment, the thin film electrodes 2 and 3 formed of the Ni-Al system alloy thin film or the Ni-Cr-Al system alloy thin film are formed on the substrate and then, the thin film electrodes 2 and 3 are heated in the oxidation atmosphere. Accordingly, the oxide film 7 mainly composed of insulating Al$_2$O$_3$ is formed on the surfaces of the thin film electrodes 2 and 3. Consequently, even if pin holes are formed in the ceramic thin film 4 deposited on the oxide film 7, insulation-defect between the upper and lower electrodes 2 and 6 can be effectively prevented.

Meanwhile, a thin film mainly composed of Al$_2$O$_3$ precisely formed hardly reacts with the ceramic thin film 4. Consequently, even if the oxide thin film 7 made of Al$_2$O$_3$ is formed on the surfaces of the thin film electrodes 2 and 3, the oxide film 7 hardly affects the ferroelectricity of the ceramic thin film 4, because the oxide film is very thin (50 Å).

FIG. 4 shows a nonvolatile RAM 10 having a capacitor structure in which a ferroelectric ceramic thin film is formed in a film deposited state on thin film electrodes made of the above described Ni-Al system alloy or Ni-Cr-Al system alloy.

The nonvolatile RAM using a ferroelectric capacitor has received attention as an alternative to a DRAM (dynamic random access memory) or a SRAM (static random access memory) in which memory is lost by turning off power. The ferroelectric capacitor has a structure in which a ferroelectric ceramic thin film having a thickness of several microns or less is sandwiched between a pair of metal electrodes. This ferroelectric ceramic thin film has the same crystal structure as that of an ordinary perovskite compound when it is made of, for example, PbTiO$_3$ or Pb(Zr, Ti)O$_3$. If an electric field is applied, the ferroelectric ceramic thin film is polarized. The polarization phenomenon is maintained even if the electric filed is removed. The direction of the polarization is reversed by applying an electric filed in the reverse direction. Consequently, if the ferroelectric capacitor is used as a capacitor of a memory cell, it is possible to hold memory by utilizing the polarization phenomenon maintained.

Figure 5:
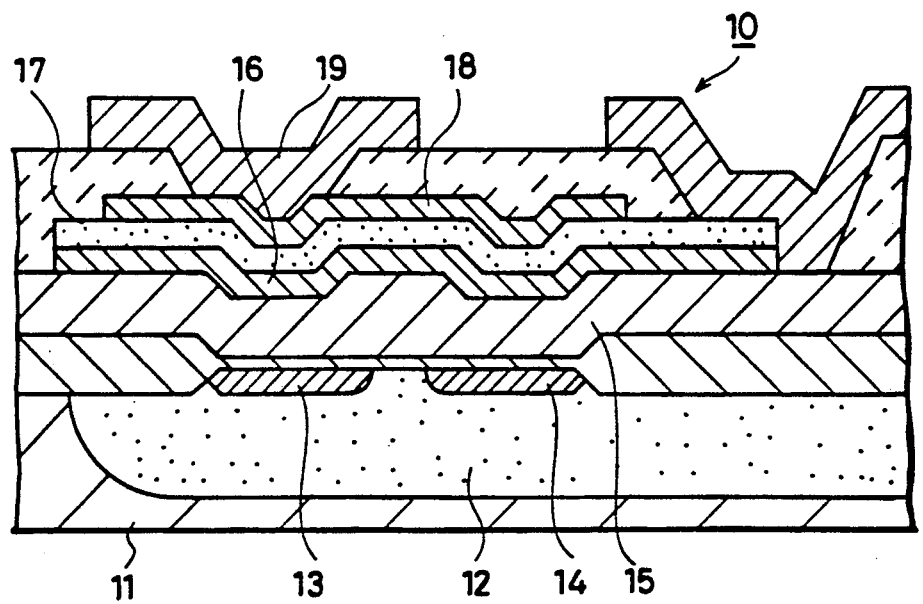
FIG. 5 is a cross sectional view for explaining a nonvolatile RAM to which one embodiment of the present invention is applied.

In FIG. 5, a P-type or N-type well 12 is formed on an N-type or P-type silicon substrate 11. 13 or 14 denotes a source or drain electrode. A CMOS (complementary metal oxide semiconductor) having the above described constituent elements is formed below a laminated structure comprising a ferroelectric ceramic thin film and electrodes shown in FIG. 5.

A substrate 15 made of MgO is laminated above the CMOS, and a thin film electrode 16 made of the Ni-Al system alloy or the Ni-Cr-Al system alloy in the above described embodiment is formed on the substrate 15. A ferroelectric ceramic thin film 17 of a $Pb(Zr, Ti)O_3$ system is laminated on the thin film electrode 16. The ceramic thin film 17 is formed in a film deposited state on the thin film electrode 16. In addition, the other electrode 18 is formed on the ceramic thin film 17. This electrode 18 may be made of the same material as that of the thin film electrode 16 or the other materials. 19 denotes a metal layer constituting a connecting conductive portion.

Although the structure shown in FIG. 5 illustrates a nonvolatile memory as one example of a ceramic electronic component to which the present invention is applied, the present invention is applicable to a ceramic electronic component in general in which thin film electrodes made of a Ni-Al system alloy material or a Ni-Cr-Al system alloy material are formed so as to make contact with a ceramic thin film.

Furthermore, as ceramic materials for constituting a ceramic thin film formed so as to make contact with thin film electrodes in the present invention, it is possible to suitably use, in addition to ceramics of a $Pb(Zr, Ti)O_3$ system and ceramics of a $PbTiO_3$ system, ceramics of a $LiNbO_3$ and a $LiTaO_3$ systems, ceramics of bismuth larger structures $Bi_4Ti_3O_{12}$ system, ceramics having a tungsten bronze structure such as lead metaniobate $PbNb_2O_6$ or lead metatantalite $PbTa_2O_6$, ceramics of lead complex perovskite ceramics such as $Pb(Mg_{\frac{1}{3}}Nb_{\frac{2}{3}})O_3-PbTiO_3$ or $Pb(Ni_{\frac{1}{3}}Nb_{\frac{2}{3}})O_3-PbTiO_3$ which is useful as a capacitor material for low temperature sintering, ceramics of a $SiO_2$ system, ceramics of a $TiO_2$ system, ceramics of a $BaTiO_3$ system, ceramics of a $SrTiO_3$ system, or ceramics of a $CaTiO_3$ system and ceramics of their solid solution system, for example.

Further, as the method of fabricating the functional ceramic thin film typified by the ferroelectric film, not only the sputtering method described in the embodiment but also the other method such as vacuum deposition method, laser-ablation, sol-gel method, chemical vapor deposition method or the like may be utilized in the present inventive ceramic electric component and the process thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ceramic electronic component, comprising:
    a ceramic thin film; and
    thin film electrodes made of a Ni-Al system alloy or a Ni-Cr-Al system alloy which are formed so as to make contact with the ceramic thin film.

2. The ceramic electronic component according to claim 1, wherein said Ni-Al system alloy has composition containing 2.5 to 8% by weight of aluminum: the remainder being nickel or a trace element.

3. The ceramic electronic component according to claim 1, wherein said Ni-Cr-Al system alloy has composition containing 8 to 25% by weight of chromium and 2.5 to 8% by weight of aluminum: the remainder being nickel and a trace element.

4. In a nonvolatile RAM comprising a ferroelectric capacitor in which electrodes are formed on both major surfaces of a ferroelectric ceramic thin film,
    the nonvolatile RAM being characterized in that said electrodes are formed of a thin film made of a Ni-Al system alloy or a Ni-Cr-Al system alloy.

5. The nonvolatile RAM according to claim 4, wherein said Ni-Al system alloy has composition containing 2.5 to 8% by weight of aluminum: the remainder being nickel and a trace element.

6. The nonvolatile RAM according to claim 4, wherein said Ni-Cr-Al system alloy has composition containing 8 to 25% by weight of chromium and 2.5 to 8% by weight of aluminum: the remainder being nickel and a trace element.

7. A method of fabricating a ceramic electronic component, comprising the steps of;
    forming on a substrate a thin film made of a Ni-Al system alloy or a Ni-Cr-Al system alloy;
    heating said thin film made of the Ni-Al system alloy or the Ni-Cr-Al system alloy in an oxidation atmosphere; and
    forming a ceramic thin film on said thin film made of the Ni-Al system alloy or the Ni-Cr-Al system alloy after heating.

8. The method according to claim 7, wherein said Ni-Al system alloy has composition containing 2.5 to 8% by weight of aluminum: the remainder being nickel and a trace element.

9. The method according to claim 7, wherein said Ni-Cr-Al system alloy has composition containing 8 to 25% by weight of chromium and 2.5 to 8% by weight of aluminum: the remainder being nickel and a trace element.

* * * * *